United States Patent [19]
Klem et al.

[11] Patent Number: 5,646,978
[45] Date of Patent: Jul. 8, 1997

[54] METHOD AND APPARATUS FOR PROVIDING INTERSWITCH HANDOVER IN PERSONAL COMMUNICATION SERVICES SYSTEMS

[75] Inventors: Russell D. Klem, Naperville; Kimberly Sue Tomasko-Dean, LaGrange, both of Ill.

[73] Assignee: Lucent Technologies Inc., Murray Hill, N.J.

[21] Appl. No.: 429,984

[22] Filed: Apr. 27, 1995

[51] Int. Cl.⁶ .................. H04Q 7/22; H04Q 7/38
[52] U.S. Cl. .......................... 455/436; 455/445
[58] Field of Search .................. 379/58, 59, 61, 379/63, 220, 60; 455/33.1, 33.2; 370/60

[56] References Cited

U.S. PATENT DOCUMENTS

| | | | |
|---|---|---|---|
| 4,592,048 | 5/1986 | Beckner et al. | 370/60 |
| 4,737,978 | 4/1988 | Burke et al. | 379/60 |
| 4,771,448 | 9/1988 | Koohogoli et al. | 379/60 |
| 4,829,554 | 5/1989 | Barnes et al. | 379/58 |
| 4,879,740 | 11/1989 | Nagashima et al. | 379/61 |
| 5,475,735 | 12/1995 | Williams et al. | 379/59 |
| 5,479,483 | 12/1995 | Furuya et al. | 379/60 |
| 5,537,610 | 7/1996 | Mauger et al. | 379/58 |

OTHER PUBLICATIONS

Cable Television Laboratories, Incorporated, "PCN and Cable: A View of Our Future" Jan. 1991.
Coker, "An Application of Wireless Access Technology and the Intelligent Network", Telephony Dec. 1991.
O'Shea, "Penetrating the Urban Jungle", Telephony Jan. 1996.
AT&T Technical Journal, vol. 64, No. 6, Part 2, Jul.–Aug. 1985, pp. 1303–1564.
"Switching And Signaling Generic Requirements For Network Access Services To Personal Communications Services (PCS) Providers", Bellcore Generic Requirements GR-2801-CORE, Issue 1, Dec. 1993.

*Primary Examiner*—William Cumming
*Attorney, Agent, or Firm*—Dennis J. Williamson

[57] ABSTRACT

A method for handling interswitch handovers in a personal communication services (PCS) system where the original switching system that hosts the radio port control unit (RPCU) that first serves the call is designated as the anchor switch. The anchor switch maintains this status for the duration of the call and is always responsible for setting up the three-way connection to effectuate the interswitch handover regardless of how many additional new switching systems host RPCUs that serve the call as the mobile station moves through the system. The additional new switching systems hosting the new RPCUs always communicate with the anchor switch and the call is always routed from the anchor switch directly to the switching system hosting the RPCU serving the mobile station. Intermediate switches are dropped from the connection when the mobile station exits the areas they serve thereby eliminating the need to maintain connections through prior switching systems.

14 Claims, 6 Drawing Sheets

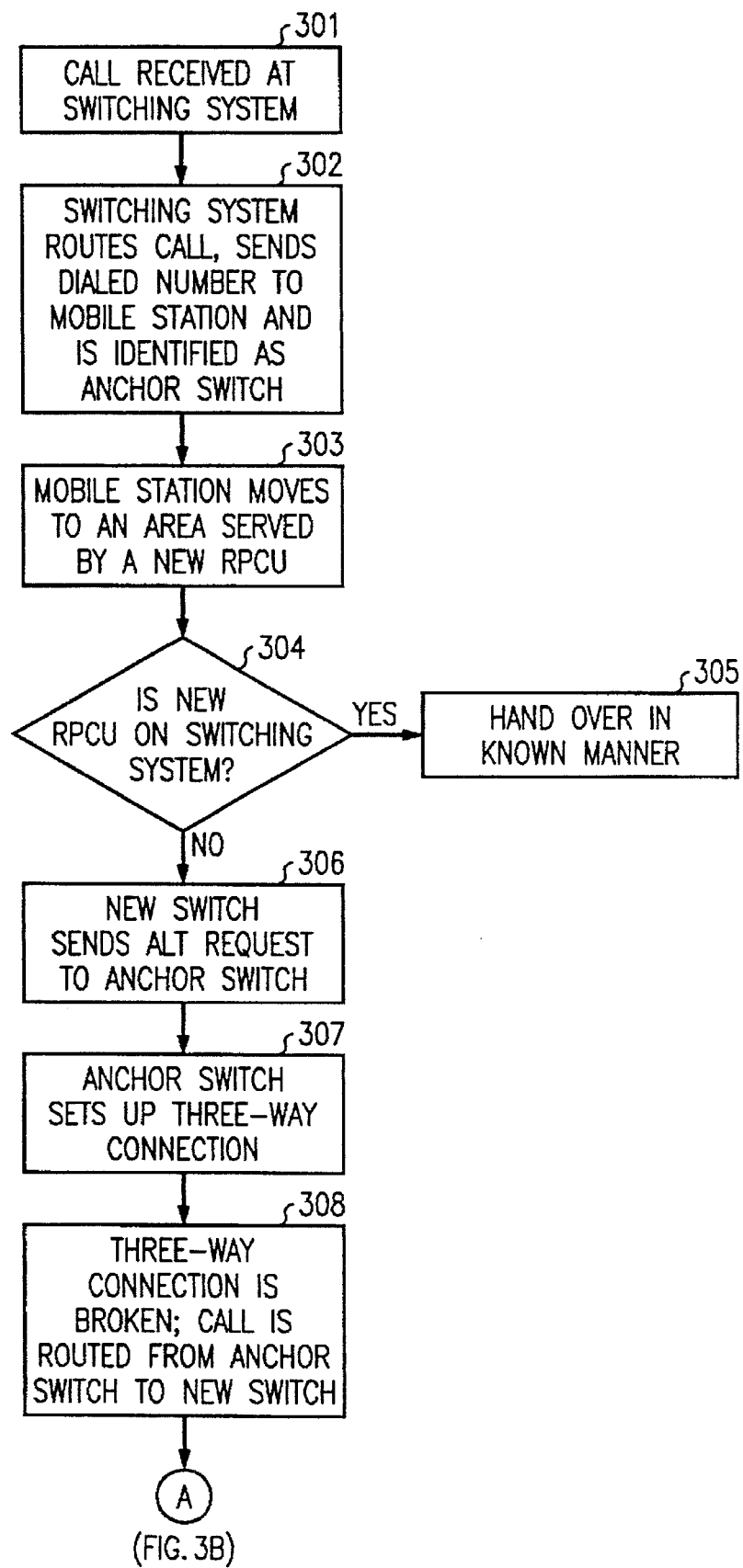

METHOD AND APPARATUS FOR PROVIDING INTERSWITCH HANDOVER IN PERSONAL COMMUNICATION SERVICES SYSTEMS

BACKGROUND OF THE INVENTION

The invention relates, generally, to personal communication services (PCS) systems and, more particularly, to a method and apparatus for providing interswitch handover, or automatic link transfer, in such systems.

As will be appreciated, PCS systems provide wireless communication services. PCS systems, unlike other wireless services such as cellular telephone networks, are intended to provide wireless service for low mobility applications where the users of the PCS move relatively slowly over limited geographic areas. For example, PCS systems are intended to provide wireless service within business complexes, large buildings, commercial parks, city business districts, universities or the like where the customer will be walking or otherwise moving slowly in a limited area. Because PCS is specifically designed for low mobility applications, it does not require the more extensive and expensive infrastructure of wireless systems such as cellular telephone networks. As a result, PCS wireless service can be provided at lower cost.

The typical PCS system, defined in Bellcore Generic Requirements GR-2801-CORE Issue 1, Dec. 1993, consists of a number of radio port control units (RPCU) each controlling a radio port having a radio transmitter/receiver for communicating with mobile stations located in the geographic service area served by that radio port. Multiple radio port control units, arranged such that their service areas are contiguous, are provided to extend the range of service beyond the geographic area served by a single RPCU. The RPCUs are connected to and communicate with switching systems over lines that transmit voice and call control signals therebetween. The switching systems are connected to, and form part of, the public switched telephone network (PSTN). Thus, PCS users are provided with wireless access to the public switched telephone network via a relatively inexpensive system.

It is to be understood that RPCUs serving contiguous geographic areas can be connected either to the same switching system or to different switching systems. When a mobile station moves between areas served by RPCUs on the same switching system, the transfer of service from the current RPCU to a new RPCU is known as an intraswitch handover or an intraswitch automatic link transfer (ALT). Such intraswitch ALTs are relatively simple to control by setting up a three-way connection in the switching system between the line or trunk from a remote station on the PSTN, a line to the current RPCU and a line to the new RPCU to maintain connectivity between the mobile station and the remote station while effectuating the handover. Once the new RPCU is serving the call, the three-way connection is broken by disconnecting the line to the first RPCU. Because a single switching system hosts both the current RPCU and the new RPCU, it recognizes the directory numbers of the lines handling the call from both RPCUs and is aware of the lines' physical location in the switching system such that the switching system can easily set up the three-way connection.

When a mobile station moves between geographic areas served by RPCUs hosted by different switching systems, the transfer of service from the current RPCU to the new RPCU is known as an interswitch handover or an interswitch ALT. Interswitch handovers have proven to be much more difficult to control than intraswitch handovers because the switching system hosting the new RPCU must complete the handover based on information that identifies the call in other switching systems. The problem of providing interswitch handover is exacerbated by the fact that standard operating systems and protocols are already in place for much of the PCS system such that any method for handling interswitch handovers must not disrupt or alter existing protocols and/or operating systems. For example, existing protocols require that an active mobile station be provided with the directory number identifying the location on the switching system of the line currently serving the call but not with any identification of any prior switching systems. Any method for handling interswitch handovers must not alter this or other similar protocols and/or operating systems. Thus, the switching system hosting the new RPCU, based on the directory number provided by the mobile station, must return to the switching system hosting the current RPCU to locate the call and set up the three-way connection which must be created to maintain connectivity between the remote station and the mobile station during the handover. Where a mobile station travels to RPCUs on more than one new switching system, connections between each of the prior switching systems must be maintained. Moreover, it is possible that the call will reappear at a switching system that hosts a prior connection, a process known as shoelacing, where a single switching system maintains two or more connections for a single call. It will be appreciated that the need to maintain all prior connections results in the allocation of a significant amount of valuable network resources for each call and unnecessarily complex routing. Finally, it is extremely difficult, and requires complex protocols, to provide supplementary services such as conference calling and call waiting where a plurality of switching systems are connected together. Further, while PCS and cellular systems both provide wireless communications service, the standards and protocols governing the operation of PCS differ from those of cellular such that existing cellular techniques are not transferable to PCS.

Thus, a problem in the art exists in that a satisfactory method for handling interswitch handovers in a PCS system that is compatible with existing PCS protocols has not been developed.

SUMMARY OF THE INVENTION

The system of the invention solves the above-noted problems and provides a method for handling interswitch handovers in a PCS system that simplifies call routing and minimizes the use of network resources. Specifically, the method of the invention designates the switching system that hosts the RPCU that first serves the call as the anchor switch. The anchor switch maintains this status for the duration of the call and is always responsible for setting up the three-way connection to effectuate the interswitch handover regardless of how many additional new switching systems host RPCUs that serve the call as the mobile station moves through the system. Each additional switching system communicates with the anchor switch and the call is always routed from the anchor switch directly to the switching system hosting the RPCU serving the mobile station. Thus, intermediate switches can be dropped from the connection when the mobile station exits the areas they serve thereby eliminating the need to maintain connections through the previously used switching systems and minimizing the network resources allocated to the call and simplifying the routing of the call.

BRIEF DESCRIPTION OF THE DRAWING

FIGS. 3A and 3B are flow charts illustrating the method of operation of the system of the invention.

DETAILED DESCRIPTION

Figure 1:
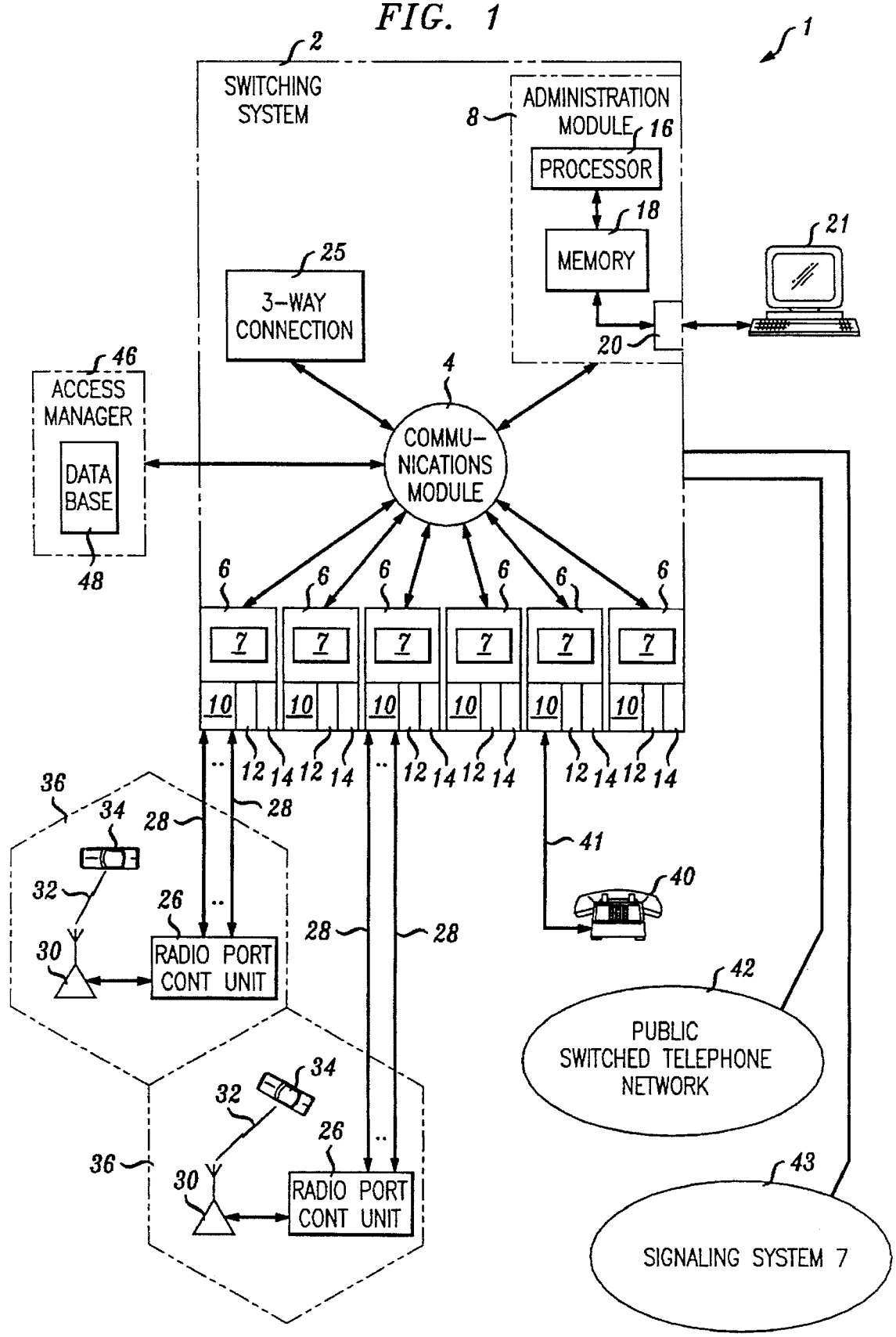
FIG. 1 is a block diagram showing a PCS switching system.

The operation of the system of the invention will be described with particular reference to the PCS system shown generally at 1 in FIG. 1. PCS system 1 consists of an ISDN electronic switching system 2 such as described in U.S. Pat. No. 4,592,048 issued to Beckner et al. on May 27, 1986. Such a switching system can consist of one of the 5ESS® family of switches, described in *AT&T Technical Journal*, Vol. 64, No. 6, part 2, pp. 1305–1564, July/August 1985, and manufactured by AT&T. The architecture of such a switching system includes a communications module 4 forming a hub and having a plurality of switch modules 6, and an administrative module 8 emanating therefrom. Each switch module 6 is controlled by processor 7 including a local data base and provides call processing, time division switching and signaling for the lines and trunks to which it is connected. Line units 10 provide interface to customer lines that connect to customer premise equipment, and trunk units 12 provide interface to trunks that connect the other elements of the network such as switches. Circuit units 14 provide tones, announcements, recorded messages, tone decoding and the like. The administrative module 8 provides functions that can be centralized such as maintenance control, craft interface, text and data base management, call routing and time slot allocation. The administrative module 8 consists of a control unit such as the AT&T 3B21D duplex processor 16 and main memory store 18. In some systems the administrative module is assisted by a separate processor that performs some of the administrative functions. The administrative module 8 also can include an input/output processor 20 providing communication between switching system 2 and peripheral devices 21 such as terminals, printers or the like. Communications module 4 is the hub of the switching system and allows communication between the administrative module 8 and the switch modules 6. Communications module 4 consists of a message switch that provides the administrative module-to-switch module and switch module-to-switch module message communications and a time multiplexed switch providing the switch module-to-switch module and switch module-to-administrative module time slot connection for voice and data communication and the clock distribution. Switching system 2 further includes a conference or three-way switching circuit 25 including a three port connection capable of establishing three way calls as will be understood by one skilled in the art. It will be appreciated that while the previously described switch architecture relates specifically to the AT&T 5ESS® switch, any switch having similar capabilities may be used and the specific switch architecture may vary.

A plurality of radio port control units (RPCU) 26 are connected to the line units 10 of switch modules 6 of switching system 2 via basic rate interface (BRI) lines 28. It will be appreciated that preferably each RPCU is connected to switching system 2 by a plurality of lines 28 such that each RPCU can serve calls to a plurality of mobile stations simultaneously. The basic rate interface is based upon a standard 144 Kb/s interface and typically supports a maximum of 2B+1D channels. The two B-channels each transmit 64 Kb/s for circuit switched connections including voice and data. The one D-channel transmits 16 Kb/s and transports all Q.931 control signaling and packet switched connections.

While the RPCUs 26 are connected to the switching system 2 by lines 28 it will be understood that the RPCUs could be connected to the switching system by trunks connected to trunk units 12, if desired. Each RPCU 26 controls one or more radio ports 30 that comprises a radio transmitter/receiver for establishing the air interface 32 between the radio port 30 and mobile stations 34. Each radio port 30 serves mobile stations located within the geographic area 36 served by the radio port. By providing a plurality of radio ports, where the service areas 36 of the ports are arranged contiguously, the geographic service range of the system can be extended indefinitely.

An access manager 46 communicates with each of the RPCUs either through switching system 2 as illustrated or by a direct data link between the RPCU and the access manager. The access manager 46, as is known in the art, includes a processor responsible for call processing functions and maintains a memory resident copy of customer data in data base 48. Specifically, the access manager is responsible for monitoring the mobile stations, authentication, audit control, overload control and the like.

Switching system 2 is also connected to the public switched telephone network 42 and to a signaling network 43 such as an SS7 network. Calls can be connected between mobile stations 34 and customer premise equipment (CPE) such as terminals, station sets, mobile stations or the like in the PSTN or connected to a CPE 40 served by switching system 2 via customer service line 41 as will be understood. For explanatory purposes, the CPE at which a call from mobile station 34 is terminated or from which a call to mobile station 34 is originated is designated a remote station in this application regardless of whether it is served by switching system 2 or is in the PSTN 42.

Under existing PCS protocols, when a mobile call is served by RPCU 26, a specific one of lines 28 connecting RPCU 26 to switching system 2 is allocated for that call. As will be appreciated, each of lines 28 is connected to the switching system 2 at a predetermined physical location or port. The physical location or port to which each line is connected is identified by a directory number that identifies the switching system hosting that port and the physical location of the port within that switching system. it should be noted that the directory number assigned to the physical location or port in switching system 2 is not the same as, and is not related to, the public directory number associated with the mobile stations. Thus, any switching system in the network can locate any line if it is provided with the directory number for that line. PCS protocols require that the directory number identifying the location of the line serving a call to or from mobile station 34 be provided to the mobile station at the time of initial call set up. The mobile station retains the directory number in a local memory and provides the directory number to the new switching system during handover procedures such that the new switching system can identify the line serving the call in the current switching system.

To effectuate a handover in the existing PCS system, the new RPCU receives the directory number from the mobile station as the mobile station moves into the geographic area served by the new RPCU. The directory number, as previously explained, identifies the location of the line in the switching system hosting the RPCU currently serving the call. The new RPCU sends a call set up request to its associated switching system requesting that a call be set up to the current RPCU. Assuming that both the current RPCU and the new RPCU are connected to the same switching system (intraswitch handover), the switching system locates the call based on the directory number and sets up a three-way connection between the remote station, the current RPCU and the new RPCU to maintain connectivity between the remote station and mobile station during the handover. For example, an intraswitch handover in the system illustrated in FIG. 1 requires a three-way connection between remote station 40, the RPCU 26 currently serving the call and the new RPCU. Once the handover is completed, the three-way connection is broken and the call is routed from the remote station to the new RPCU through the switching system hosting the new RPCU.

As will be appreciated, intraswitch handovers can easily be made under this protocol because the switching system hosts both RPCUs. As a result, the switching system can internally locate the lines to both RPCUs and set up the three-way connection. Moreover, when the switching system breaks the three-way connection after the handover is complete, no superfluous network resources are used and the call is routed between the remote station and mobile station through a single switching system.

The first interswitch handover can also be relatively easily made under existing PCS protocols. When a mobile station moves from the original switching system to a first new switching system, the mobile station provides the directory number of the original switching system to the first new switching system. The first new switching system sends an ALT request to the identified original switching system and the original switching systems creates the three-way connection as previously described. Moreover, the new switching system provides the mobile station with a new directory number identifying the location of the line serving the call on the new switching system as required by PCS protocols. Again no superfluous network resources are used because the call is routed from the remote station through original switching system and the new switching system directly to the mobile station just as if mobile station 34 was a stationary CPE served by the new switching system.

Existing PCS protocols do not, however, efficiently handle a second interswitch handover where the mobile station moves to another geographic area served by a second new switching system. In such prior art systems, the mobile station provides the directory number from the first new switching system to the second new switching system and the second new switching system sends an ALT request to the first new switching system. The first new switching system sets up the three-way connection and handover is completed as previously described. Significantly, the call is now routed from the original switching system, through the first new switching system to the second new switching system. The first new switching system is used only because of the limitations of the existing handover procedure and is not required for normal call routing. Thus, network resources are inefficiently allocated and routing is unnecessarily complex. Moreover, every time the mobile station moves to another switching system (including switching systems that are already serving the call) a separate connection is established and the string of connected switching systems lengthens and becomes more complicated.

The method of the invention overcomes this problem as will be hereinafter explained. Referring more particularly to FIGS. 2A–2E, a typical PCS system includes a plurality of RPCUs connected to a plurality of switching systems. For illustrative purposes three switching systems 2a, 2b, and 2c are shown hosting RPCUs 26a, 26b, and 26c , respectively. It will be appreciated, however, that a greater or fewer number of switching systems and RPCUs may be provided and that each switching system can host a plurality of RPCUs. To facilitate explanation of the operation of the system of the invention, the switching system that initially receives a call to or from mobile station 34 is designated the anchor switch, the switching system presently serving the call is designated the current switch and the switching system that will serve the call when the mobile station leaves the current switch is designated the new switch.

Figure 2A:
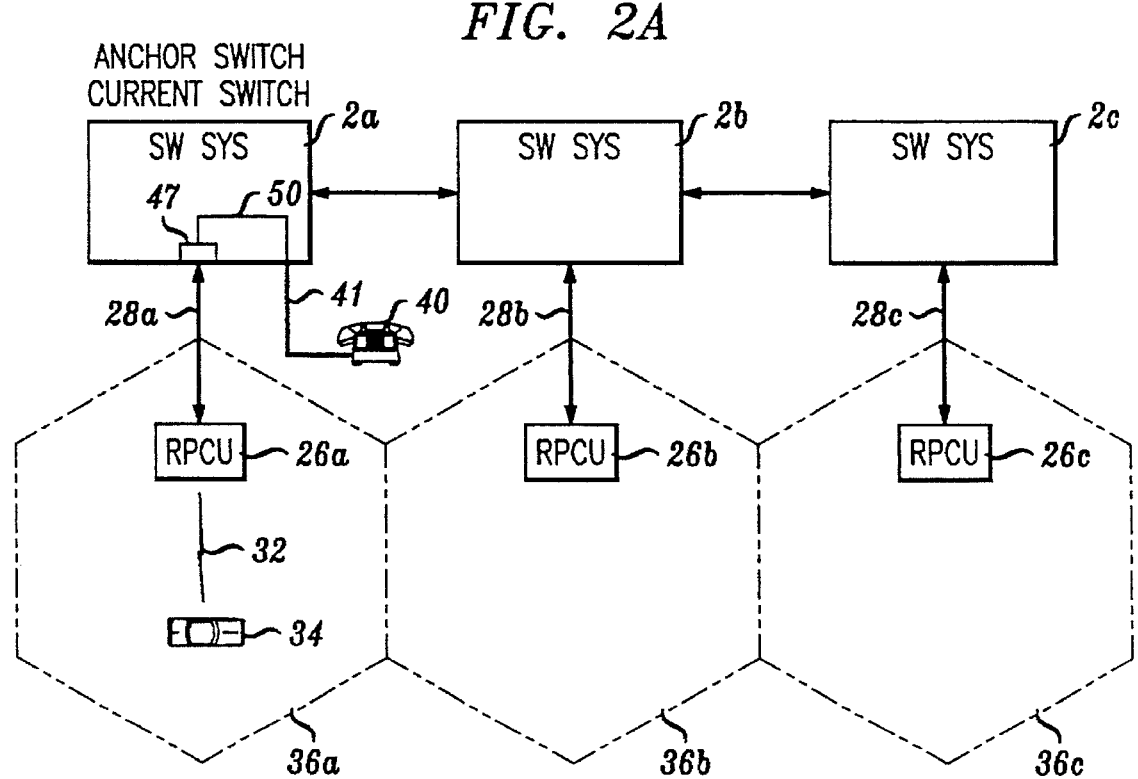
FIGS. 2A–2E are block diagrams showing the routing of a call using the interswitch handover system of the invention.

FIG. 2A illustrates the situation where a call is received at switching system 2a that either originated at mobile station 34 or that originated at a remote station, such as CPE 40, and terminated at mobile station 34. In the illustrated embodiment, the call path through switching system 2a is represented by line 50 and connects BRI line 28a from RPCU 26a to customer service line 41 from CPE 40.

As will be appreciated, the specific line 28a serving the call is connected to switching system 2a at a predetermined physical location or port 47. Port 47 is identified by a directory number $DN_1$ that identifies to the network the switching system to which the line is connected and the line's physical location or port in that switching system. Thus, the physical location of any line in the system can be identified by its corresponding directory number. When a call is set up, a line is selected to serve the call and the selected line is identified by its directory number. Under existing PCS protocols, the directory number is transmitted to the mobile station 34 served by the selected line such that the mobile station can identify the line serving its call. In the illustrative embodiment directory number $DN_1$ is transmitted to the mobile station 34 over air interface 32.

In the scenario illustrated in FIG. 2A, switching system 2a is the host switching system for the RPCU 26a serving the original call to mobile station 34 and is, therefore, designated the anchor switch. Because RPCU 26a is presently serving the call, switching system 2a is also the designated current switch. As the anchor switch, it is responsible for all of the call handovers for mobile station 34. It will be appreciated that any switching system can constitute the anchor switch provided it hosts the RPCU that initially serves the call. The anchor switch maintains a record in a data base identifying it as the anchor switch for the call. The record also includes an identification of the incoming line or trunk connected to the remote party, the directory number of the line connected to the RPCU, an identification of the trunk connected to the switching system hosting the RPCU where the RPCU is not hosted by the anchor switch, and the telephone number of the mobile station. In the illustrated switching system 2, the record can be kept in memory 18 of administration module 8 (FIG. 1), in a local data base of one of the switch modules 6 or in another data base.

Figure 2B:
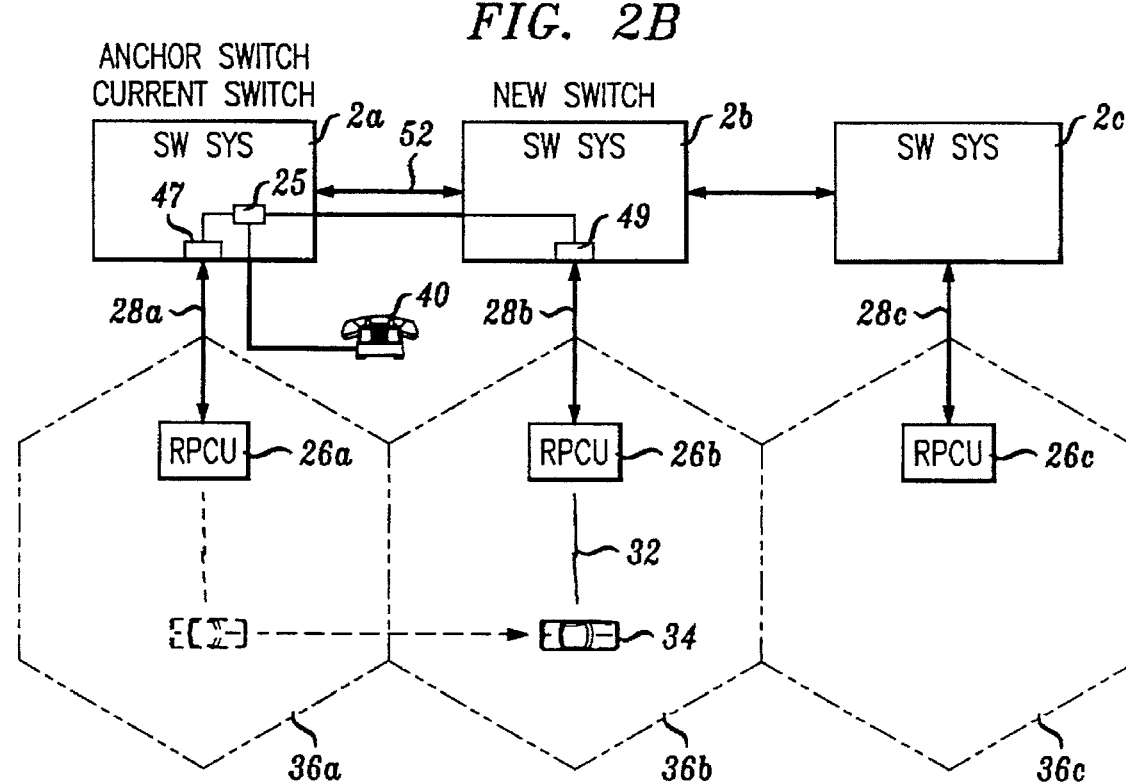
Figure 2C:
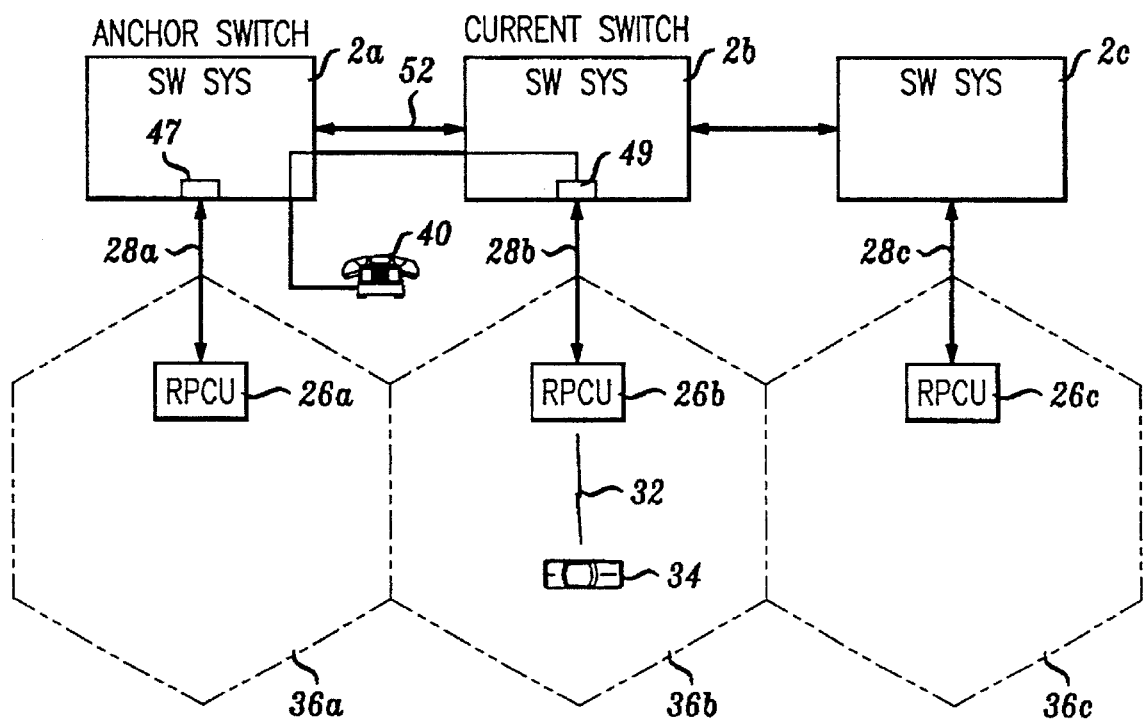

Referring to FIG. 2B, as mobile station 34 moves from the area 36a served by RPCU 26a to the area 36b served by RPCU 26b, RPCU 26b establishes radio contact with mobile station 34. Based on the strength of the signal (or such other criteria that determines the movement of a mobile station from one area to the next), RPCU 26b determines that it should be serving the call (i.e. that mobile station is in area 36b), as will be understood. Switching system 2a is designated the anchor switch and the current switch while switching system 2b is designated the new switch.

RPCU 26b communicates with access manager 46 (see FIG. 1) for purposes of authenticating the call and the like as will be understood. Once the RPCU 26b receives an acknowledgment from access manager 46, RPCU 26b selects a line 28b for serving the call and sends an ALT request in a call set up message over line 28b to switching system 2b including directory number $DN_1$ received from mobile station 34. Switching system 2b, based on $DN_1$, identifies switching system 2a as the current switch. Accordingly, switching system 2b (the new switch) sends a call set up message over data link 52 to switching system 2a (the current switch) including an ALT request for the identified directory number $DN_1$. Switching system 2a, in response to the ALT request, sets up a three-way connection between CPE 40, RPCU 26a and RPCU 26b using three port connection 25 as is known in the art, shown in FIG. 2B. The physical location or port 49 of line 28b on switching system 2b is identified by directory number $DN_2$ and directory number $DN_2$ is provided to mobile station 34 as required under existing PCS protocols and to the anchor switch, switching system 2a, such that the anchor switch can map the location of the call in the new switch to the record of the call stored in memory 18 to uniquely identify the call.

The three-way connection is maintained until the handover to RPCU 26b is completed. Once the handover is completed switching system 2b sends an ALT request in a call set up message via data link 52 to switching system 2a acknowledging that the handover is completed and that RPCU 26b is serving the call. Upon receipt of the acknowledgment message, switching system 2a breaks the three-way connection such that the call is routed from CPE 40 through switching system 2a to switching system 2b and RPCU 26b as shown by line 55 in FIG. 2C. Switching system 2a maintains its status as the anchor switch and switching system 2b is designated the current switch. Moreover, switching system 2b maintains a record in its memory 18 (or in another data base) that identifies switching system 2a as the anchor switch and is used to identify the anchor switch when an ALT request is made at switching system 2b.

Figure 2D:
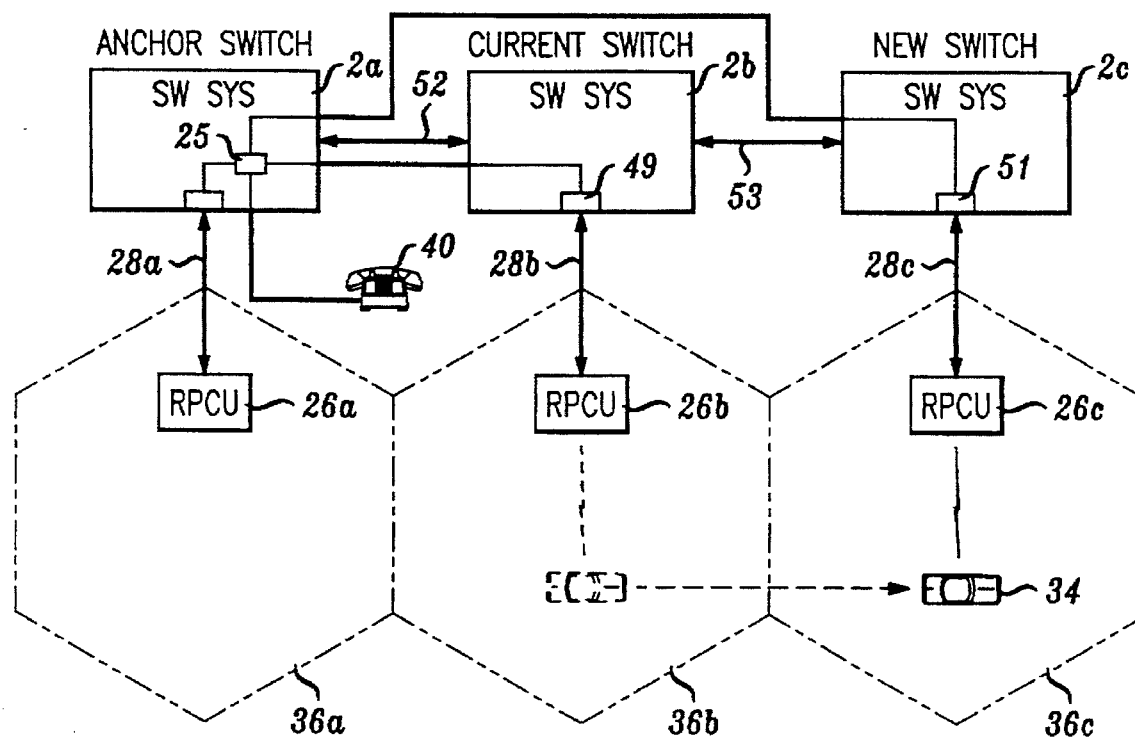
Figure 2E:
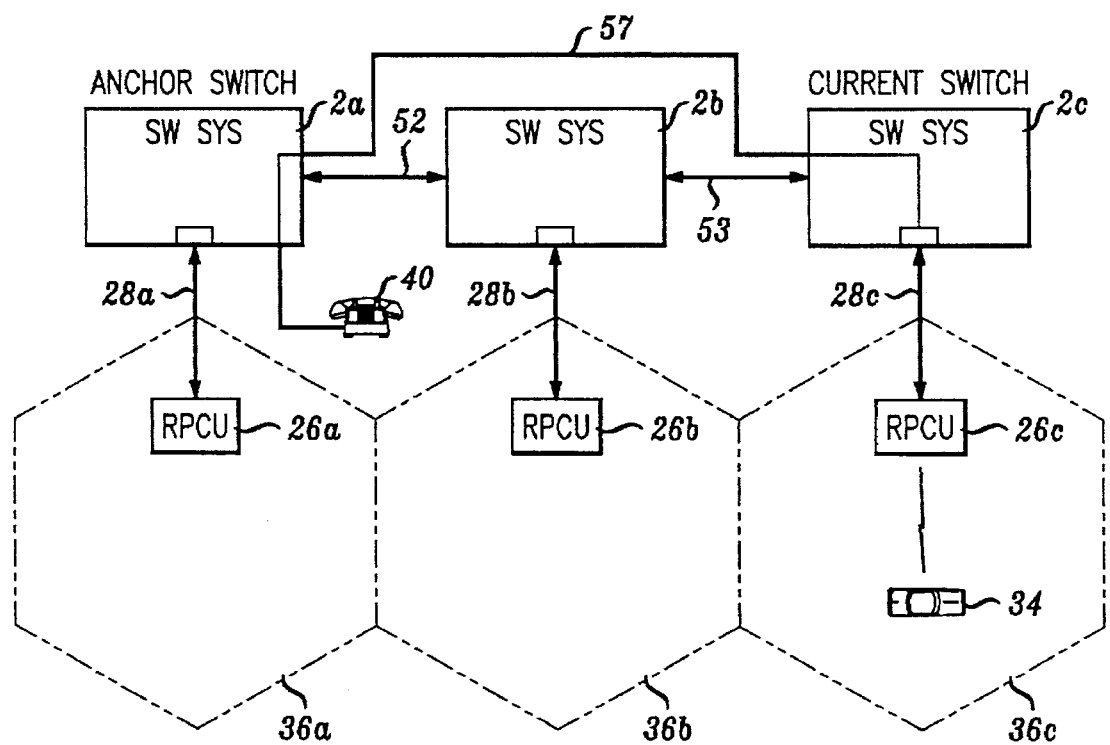

Referring to FIG. 2D, as the mobile station 34 moves from area 36b served by RPCU 26b to the area 36c served by RPCU 26c, RPCU 26c establishes radio contact with mobile station 34. RPCU 26c, based on the strength of the signal, for example, from mobile station 34, determines that it should be serving the call as will be understood. Switching system 2a maintains its status as the anchor switch, switching system 2b maintains its status as the current switch and switching system 2c is designated the new switch.

After performing the authentication procedure with the access manager 46 as previously described, RPCU 26c sends an ALT request in a call set up message (including directory number $DN_2$) via line 28c to switching system 2c requesting that switching system 2c create a call path for the call identified by directory number $DN_2$. Switching system 2c sends an ALT request in a call set up message over data link 53 to switching system 2b, the current switch identified by the directory number $DN_2$. Because switching system 2b did not originally host the call, it is not the anchor switch. Therefore, upon receiving the ALT request from switching system 2c (the new switch), switching system 2b (the current switch) retrieves the identity of the anchor switch from its data base 18 and responds to the ALT request from switching system 2a with a message identifying the anchor switch and also with instructions to release any resources reserved as a result of switching system 2c having sent out the previous ALT request in a call set up message. The new switch, switching system 2c, then sends an ALT request in a call set up message directly to the anchor switch, switching system 2a, as identified by switching system 2b. The new switch, switching system 2c, also maintains a record in its memory 18 identifying the anchor switch for future reference should mobile station 34 move to an area served by an RPCU on another switching system.

Switching system 2a, in response to the ALT request in a call set up message from the switching system 2c, sets up a three-way connection such that the call from CPE 40 communicates with both RPCU 26b and RPCU 26c as best shown in FIG. 2D. Once the handover is completed, RPCU 26c sends a message to switching system 2a acknowledging that the handover is complete and that RPCU 26c is serving the call. The directory number $DN_3$ identifying the location or port 57 of line 28c on switching system 2c is provided to mobile station 34 as is presently done under existing PCS protocols. The three-way connection is broken at switching system 2a such that the call is routed through the anchor switch directly to the new switch without routing through switching system 2b as shown by line 57 in FIG. 2E.

It is to be understood that routing directly from the anchor switch to the new switch does not preclude the use of intermediate switches for normal routing purposes. By routing the call directly from the anchor switch to the current switch, it is meant that the prior current switches are bypassed or disconnected. It should be noted that where intermediate switches are used to route the call, these intermediate switches constitute the normal routing path for any call between the anchor switch and new switch, such that no extra network resources are used because of the interswitch handover.

Figure 3B:
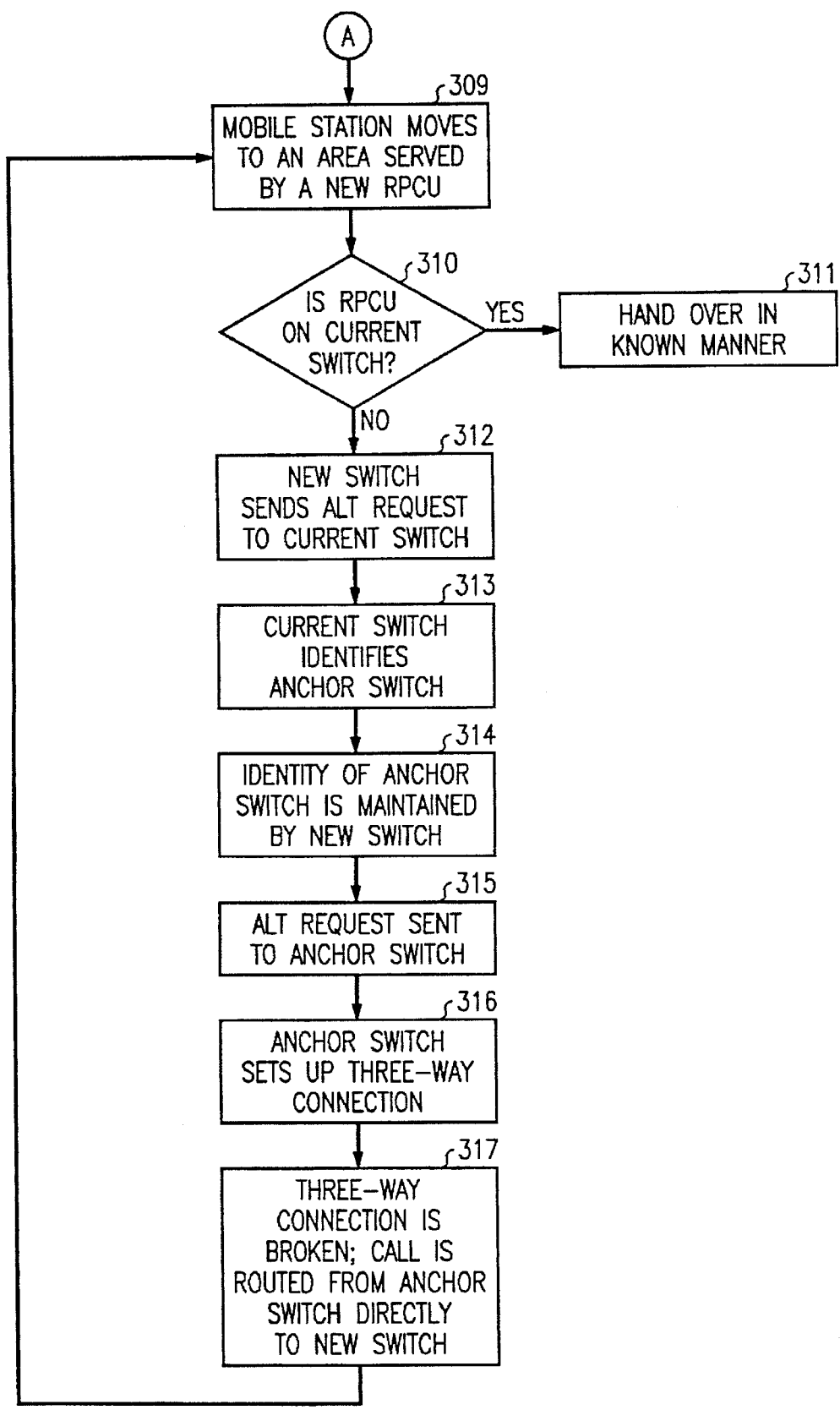

The method of operation of the system will be described with specific reference to the flowchart of FIGS. 3A and 3B. The system is initiated when a call is received at a switching system either to or from a mobile station served by an RPCU hosted by that switching system (block 301). The switching system routes the call in the known manner, provides the appropriate directory number to the mobile station and maintains a record identifying itself as the anchor switch (block 302). If the mobile station moves to an area served by a new RPCU (block 303), the anchor switch determines if the RPCU is hosted by the same anchor switch (block 304). If it is, a three-way connection is established and a handover is completed in the known manner (block 305). If the new RPCU is not hosted by the anchor switch, the new switch hosting the new RPCU sends an ALT request in a call set up message to the anchor switch (including the new directory number of the line serving the call) in response to a call set up message from the new RPCU and maintains a record of the identity of the anchor switch (block 306). In response to the ALT request, the anchor switch sets up a three-way connection between the anchor RPCU, the new RPCU and the remote station (block 307). The three-way connection is broken once the handover to the new RPCU is completed such that the call is routed through the anchor switch to the current switch (block 308). If the mobile station moves to another area (block 309) and this area is served by a new RPCU hosted by the current switch (block 310), a three-way connection is established in the current switch and a handover is completed in the normal manner and the new directory number of the line serving the call is provided to the anchor switch (block 311 ). If the mobile station moves to an area served by a RPCU hosted by another new switch (block 310), the new switch sends an ALT request in a call set up message to the current switch in response to a call set up request from its RPCU (block 312). The current switch, in response to the ALT request, sends a message back to the new switch identifying the anchor switch (block 313). The new switch maintains a record of the identity of the anchor switch (block 314) and sends an ALT request in a call set up message to the anchor switch (block 315). In response to the ALT request, the anchor switch sets up a three-way connection between the remote station, the current RPCU and the new RPCU (block 316). Once the handover is complete, the three-way connection is broken and the call is routed from the anchor switch directly to the new switch (block 317). This process is repeated every time the mobile station travels to an area hosted by a new RPCU such that the need to maintain the connections between intermediate switching systems is eliminated.

As a result of the handover system of the invention, the call is routed directly from the anchor switch to the current switch without the need to maintain the connection through switching systems that had previously served the call. This eliminates the problem of maintaining prior connections where a call is routed through a plurality of switches that had previously served the call but are no longer required for normal routing purposes. Moreover, the handover system of the invention provides for interswitch handover without affecting existing PCS protocols. A further advantage of the interswitch handover procedure of the invention is that it facilitates the handling of interactions with supplementary telephony services such as conference calling and call waiting. The process of the invention allows these supplementary services to be controlled at the anchor switch, greatly simplifying the protocols for controlling these services thereby enhancing the networks ability to provide supplementary services.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A method for providing interswitch handovers of calls in a wireless telecommunications system having a plurality of switching systems in communication with one another, selected ones of said switching systems each hosting a radio port control unit (RPCU) for communicating over an air interface with a mobile station, comprising the steps of:

serving a call to or from a mobile station located in a first geographic area served by a first RPCU hosted by a first of said plurality of switching systems;

transferring the call to a second RPCU hosted by a second of said plurality of switching systems when said mobile station relocates to a second geographic area served by the second RPCU;

identifying a third RPCU for serving the call when said mobile station moves to a third geographic area served by the third RPCU, said third RPCU being hosted by a third of said plurality of switching systems;

sending a call set up request from the third RPCU to said third switching system;

sending a first automatic link transfer (ALT) request to the second switching system;

transmitting the identity of the first switching system to the third switching system in response to the first ALT request;

transmitting a second ALT request to the first of said plurality switching system; and routing the call from the first switching system to the third switching system without routing through the second switching system.

2. The method of claim 1, further comprising the steps of connecting the call from the second RPCU at a predetermined location on said second switching system and identifying the predetermined location with a first directory number.

3. The method of claim 2, further including the step of providing said first directory number to said third switching system.

4. The method of claim 3, wherein the first directory number is provided to said third switching system by said mobile station to allow said third switching system to identify the call in said second switching system.

5. The method of claim 1, wherein the step of transmitting the identity of the first switching system includes the step of identifying the first switching system by the second switching system.

6. The method of claim 1, wherein the step of routing the call includes the step of creating a three-way connection in said first switching system.

7. The method of claim 6, further including the step of creating the three-way connection between the second RPCU, the third RPCU and a remote station.

8. The method of claim 7, further including the step of breaking the three-way connection.

9. The method of claim 1, wherein the first switching system constitutes an anchor switch where all interswitch handovers are controlled.

10. An apparatus for providing interswitch handover of calls in a wireless telecommunications system having a plurality of switching systems in communication with one another, selected ones of said switching systems each hosting a means for communicating over an air interface with a mobile station, comprising the steps of:

a first means for communicating hosted by a first of said plurality of switching systems for serving a call to or from a mobile station located in a first geographic area served by the first means;

means for transferring the call to a second means for communicating hosted by a second of said plurality of switching systems when said mobile station relocates to a second geographic area served by the second means;

means for identifying a third means for communicating for serving the call when said mobile station moves into a third geographic area served by the third means, said third means for communicating being hosted by a third of said plurality of switching systems;

means for sending a call set up request from the third means for communicating to said third switching system;

means for sending a first automatic link transfer (ALT) request to the second switching system;

means for transmitting the identity of the first switching system to the third switching system in response to the first ALT request;

means for transmitting a second ALT request to the first of said plurality switching system; and means for routing the call from the first switching system to the third switching system without routing through the second switching system.

11. The apparatus of claim 10, further including means for connecting the call from the second means for communicating at a predetermined location on said second switching system, said predetermined location being identified by a first directory number.

12. The apparatus of claim 11, further including means for providing said first directory number to said third switching system.

13. The apparatus of claim 12, wherein means for providing the first directory number to said third switching system comprises said mobile station.

14. The method of claim 10, wherein the means of routing the call includes a means for creating a three-way connection in said first switching system.

* * * * *